United States Patent [19]

Tucker

[11] 4,151,554
[45] Apr. 24, 1979

[54] LIQUID COUPLED COLOR-TELEVISION IMAGE PROJECTOR

[76] Inventor: Arthur R. Tucker, 1 Tico Rd., Titusville, Fla. 32780

[21] Appl. No.: 858,358

[22] Filed: Dec. 7, 1977

[51] Int. Cl.² ............................................. H04N 9/16
[52] U.S. Cl. ........................................ 358/60; 358/64
[58] Field of Search ................. 358/60, 64, 55, 250, 358/237, 238, 239; 350/174; 353/54

[56] References Cited

U.S. PATENT DOCUMENTS

| | | | |
|---|---|---|---|
| 1,277,040 | 8/1918 | Brewster | 350/171 |
| 2,342,778 | 2/1944 | Wolff | 358/237 |
| 2,540,721 | 2/1951 | Fyler | 358/237 |
| 2,549,585 | 4/1951 | Epstein | 358/60 |
| 2,642,487 | 6/1953 | Schroeder | 358/64 |
| 2,672,502 | 3/1954 | Albright | 358/60 |
| 2,839,599 | 6/1958 | Epstein | 358/64 |
| 2,973,683 | 3/1961 | Rowe et al. | 358/60 |
| 4,027,328 | 5/1977 | Lessman | 358/64 |

FOREIGN PATENT DOCUMENTS

| | | | |
|---|---|---|---|
| 513739 | 10/1939 | Fed. Rep. of Germany | 358/237 |
| 1327793 | 4/1963 | France | 358/60 |

*Primary Examiner*—Robert L. Griffin
*Assistant Examiner*—Joseph A. Orsino, Jr.
*Attorney, Agent, or Firm*—Samuelson & Jacob

[57] ABSTRACT

A color television image projector in which three television projection cathode ray tubes, one for each television primary color, are arranged in a T-shaped array with the face plates of the cathode ray tubes placed in a chamber, and crossed dichroic mirrors are located in the chamber for presenting a single image, composed of the primary color images in superimposed registration, at a window in the chamber. The chamber is filled with a liquid having an index of refraction approximately the same as that of the face plates, the mirror substrates, and the window, and cooling means is associated with the chamber for removing heat from the liquid in the chamber. A projection lens system is associated with the window for projecting the single image presented at the window.

32 Claims, 4 Drawing Figures

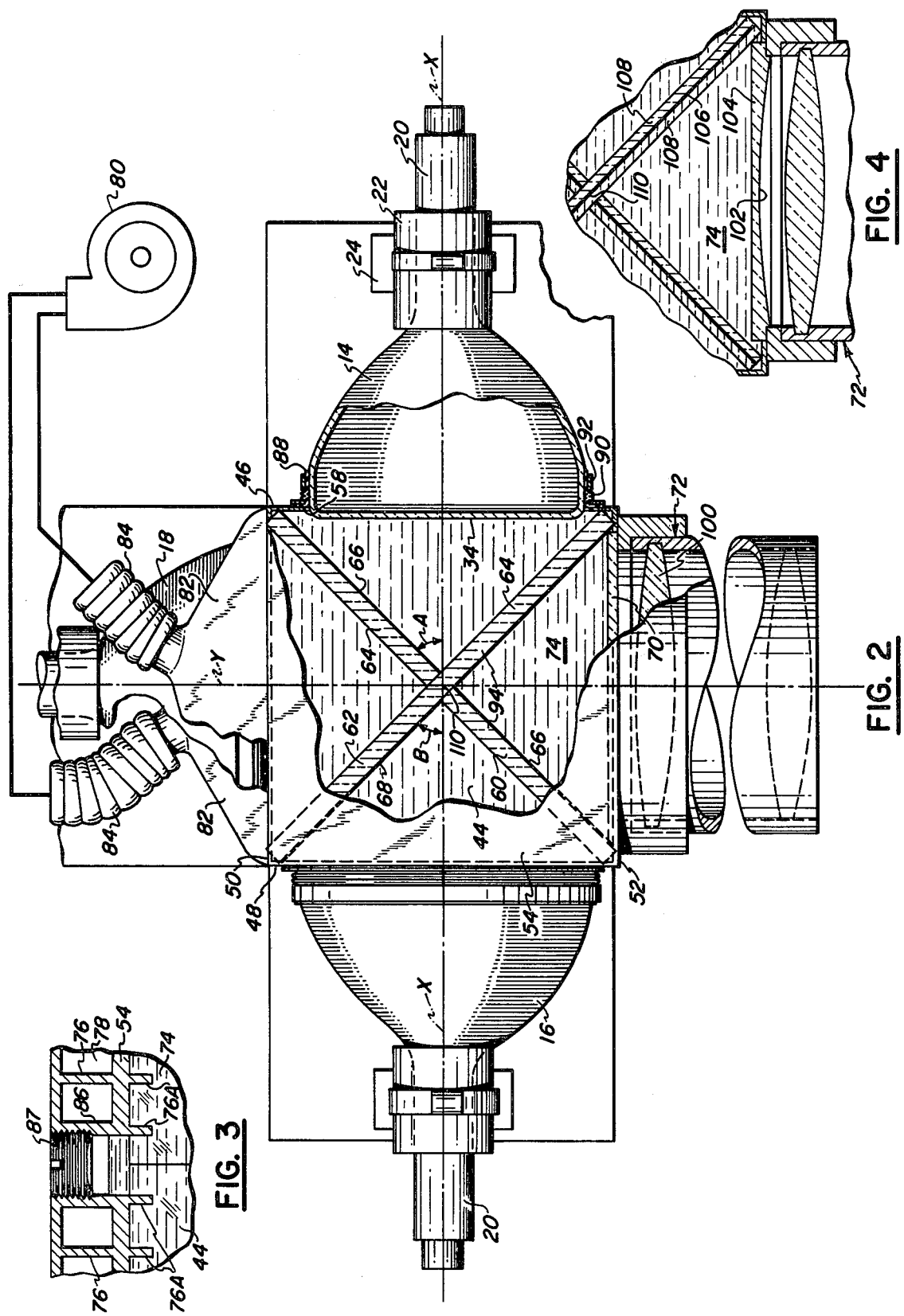

LIQUID COUPLED COLOR-TELEVISION IMAGE PROJECTOR

The present invention relates generally to image projectors and pertains, more specifically, to color-television projectors of the type in which images in each one of the television primary colors are provided by separate cathode ray tubes and are superimposed upon one another to establish a single, full-color image suitable for viewing in dimensions much larger than those provided by the face plates of the cathode ray tubes themselves.

It has long been recognized that very large images can be attained for television viewing by using projection techniques. Cathode ray tubes have been developed which provide high intensity images suitable for projection onto screens which are very much larger than the face plates of the tubes themselves. In projecting color-television images of such high intensity, it has been found advantageous to employ separate cathode ray tubes for each of the television primary colors and to superimpose the separate images into a single full-color image suitable for viewing in large sizes.

Among the more commercially successful color-television projectors are those in which the three primary color cathode ray tubes are placed along axes which enable the three primary color images to converge and register at the projection screen. Such an arrangement has several disadvantages. First, the three images must be shaped separately to compensate for keystoning and focal plane shift. Second, when utilizing a high-gain screen, compensation must be provided for color shading due to the projection of each of the three colors from a different source. Further, once the projection unit is adjusted for a specific throw distance, extensive readjustment is required if the distance between projector and screen is altered.

It has been suggested that a projector with a single exit pupil could eliminate the above-outlined disadvantages and projectors have been designed in which primary color images projected by separate cathode ray tubes have been combined through the use of dichroic mirrors to establish a single image for projection from a single exit. However, in order to be practical, such a projector requires close proximity among the projection cathode ray tubes and the related dichroic mirrors and, since the required high intensity images lead to concomitant high power and the requirement to dissipate large amounts of heat, the suggested arrangements have not been feasible for high intensity images. The use of tangential air cooling has led to immediate or delayed cracking of the face plates of the projection cathode ray tubes. Because of the high voltages involved, dust precipitation becomes a problem. In addition, where the dichroic mirrors are constructed with a substrate heavy enough to withstand the thermal and mechanical stresses of the environment, optical problems arise from unwanted second-surface reflected images and refractive index changes.

It is an object of the present invention to provide an image projector in which separate high intensity images can be superimposed upon one another to establish a single image within a relatively close environment for projection through a single exit pupil, without the deleterious thermal, mechanical and optical effects outlined above, and without the necessity for complex electronic corrective measures.

Another object of the invention is to provide a color-television image projector of the type having a single exit pupil and in which individual television single color images of high intensity are produced by separate television projection cathode ray tubes placed in an array in which the face plates of the tubes are in relatively close proximity with one another and with mirror means which superimpose the individual images in a single full-color image for projection through the exit, all within a chamber filled with a liquid having a relatively high index of refraction for bringing the focal plane of the single full-color image in close proximity with the exit.

Still another object of the invention is to provide a color-television image projector of the type described and in which the liquid in the chamber has an index of refraction approximately the same as that of the face plates of the cathode ray tubes, the substrates of the mirrors, and the single exit window, thus reducing second surface reflections and skew ray deviations.

Yet another object of the invention is to provide a color-television image projector of the type described and which includes cooling means for removing heat from the chamber and the various elements in the chamber, through the liquid in the chamber.

A further object of the invention is to provide a color-television image projector of the type described which eliminates the need for certain color corrections while enabling other color corrections to be made among the elements which couple together the television single color projection cathode ray tubes for superimposing their respective single color images, thereby enabling the use of a simplified, more economical projection lens system.

A still further object of the invention is to provide a color-television image projector of the type described which employs a single projection lens system enabling ease of operation as well as simplicity and economy of manufacture.

Another object of the invention is to provide a color-television image projector of the type described and in which heat and radiation hazards are reduced.

The above objects, as well as still further objects and advantages, are attaind by the present invention which may be described briefly as an image projector in which images from a plurality of image-producing devices are superimposed into a single projected image, the projector comprising a housing including a wall and an enclosed chamber, the image-producing devices being associated with the housing wall so as to communicate with the chamber, a transparent window in the housing wall, color-selective mirror means located within the chamber for directing the image from at least one of the image-producing devices to the window such that the images of the image-producing devices will be in superimposed registration with one another, a transparent liquid filling the chamber and contacting the image-producing devices, the mirror means, the window and the housing wall, the transparent liquid having a relatively high index of refraction for bringing the focal plane of the superimposed images in close proximity with the window, and a projection lens system associated with the window for projecting the superimposed images appearing at the window. In a preferred embodiment, the projector is a color-television image projector and the image-producing devices are cathode ray tubes having image-producing face plates placed in the housing wall, each cathode ray tube being capable of producing a single-color image so that the single projected image is a full-color television image.

The invention will be more fully understood, while further objects and advantages will become apparent, in the following detailed description of embodiments of the invention illustrated in the accompanying drawing, in which:

FIG. 2 is a partially diagramatic plan view of the projector, with portions cut away to illustrate internal details;

FIG. 3 is a fragmentary cross-sectional view taken along line 3—3 of FIG. 1; and FIG. 4 is a fragmentary plan view illustrating an alternate embodiment.

Figure 1:
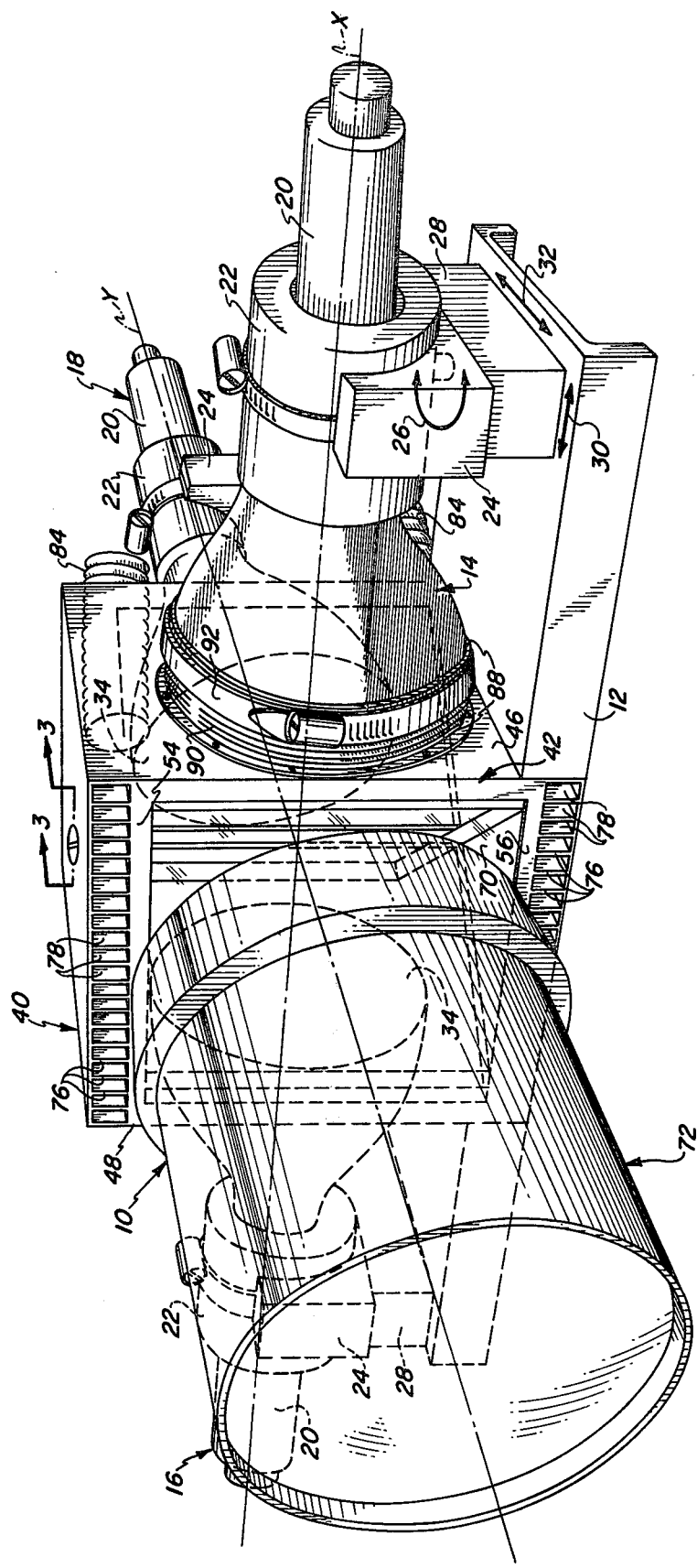
FIG. 1 is a partially diagramatic perspective view of a color-television image projector constructed in accordance with the invention.

Referring now to the drawing, and especially to FIGS. 1 and 2 thereof, a projector constructed in accordance with the invention is illustrated, partially diagramatically, in the form of a color-television image projector 10. Projector 10 includes a frame 12 which, in this instance, carries three image-producing devices in the form of high-intensity color-television projection cathode ray tubes 14, 16 and 18 placed in a T-shaped array in which first and second tubes 14 and 16 lie along a common axis X and tube 18 lies along an axis Y which is in the same plane as axis X, but is perpendicular to axis X. Each tube has a neck 20 surrounded by the usual deflection yoke 22 and carried by a bracket 24 which is mounted for selective swinging movement, in the direction of arrow 26, upon a mounting block 28. Mounting block 28 is placed upon frame 12 and selectively may be moved longitudinally, in the direction of arrow 30, and laterally, in the direction of arrow 32, relative to the frame for purposes which will be described more fully hereinafter.

Each tube 14, 16 and 18 has a face plate 34 upon which a high-intensity television image is produced. Each image is in a single color, in this instance the images being produced in the television primary colors, i.e., the image on the face plate of tube 14 is blue, the image on the face plate of tube 16 is red and the image on the face plate of tube 18 is green. A housing 40 is located on frame 12 and includes a wall 42 which establishes a chamber 44 within the housing 40. Preferably, the housing 40 is in the form of a parallelepiped having six wall portions shown in the form of opposite side walls 46 and 48, a back wall 50, a front wall 52, a top wall 54 and a bottom wall 56. The tubes 14, 16 and 18 pass through openings 58 in the side walls 46 and 48 and in back wall 50 so that the face plates 34 communicate with chamber 44.

In order to combine the individual images projected from the face plates 34 into a single, full-color image, mirror means in the form of crossed color-selective mirrors 60 and 62 are mounted within the chamber 44. Suitable color-selective mirrors currently available are known as dichroic mirrors and usually are constructed in the form of a coating or layer on a transparent substrate. Mirror 60 has a transparent member in the form of transparent substrate 64 which carries a layer 66 making an acute angle A with axis X and capable of reflecting the blue image of tube 14 toward the front wall 52. Mirror 62 also has a transparent substrate 64 which carries a layer 68, layer 68 making an acute angle B with axis X and being capable of reflecting the red image of tube 16 toward the front wall 52. The layers 66 and 68 are chosen so that the color reflected by each mirror 60 and 62 toward the front wall 52 corresponds to the color of the image produced by the respective cathode ray tubes 14 and 16. Angles A and B preferably are about 45°. The green image projected by tube 18 passes through both mirrors 60 and 62 without reflection. In this manner, the three individual single-color images provided by the three tubes 14, 16 and 18 are combined, or superimposed upon one another, to establish a single, full-color image at the front wall 52. A transparent window 70 is placed in front wall 52 and a projection lens system 72 is associated with the window 70 so that the single, full-color image at window 70 is projected through lens system 72 to a remote screen (not shown) for viewing.

In order to attain maximum effectiveness, the face plates 34 of tubes 14, 16 and 18 are placed in close proximity to the mirrors 60 and 62 and, hence, are in close proximity to one another. Because of the high intensity of the images provided at the face plates 34, a great deal of heat is generated within the chamber 44. In order to dissipate the heat effectively, chamber 44 is filled with a liquid 74 and is sealed. Liquid 74 comes into direct contact with the face plates 34 and the mirrors 60 and 62, as well as with the wall 42 of housing 40. Cooling means is associated with the top wall 54 and the bottom wall 56 for removing heat from chamber 44, the cooling means preferably including heat sinks shown in the form of cooling fins 76 providing air passages 78 through which cooling air may be passed by means of a blower 80 connected to manifolds 82 through air ducts 84. For added effectiveness, additional cooling fins may extend into the liquid 74 in chamber 44, as seen at 76A in FIG. 3. In this manner, heat generated by the formation of high-intensity images at face plates 34 is transferred effectively away from the face plates 34 and the mirrors 60 and 62 by the liquid 74 and out of the chamber 44 through the cooling means.

Liquid 74 is placed within the chamber 44 through a filler pipe 86 passing through the top wall 54. As best seen in FIG. 3, filler pipe 86 also serves as a bubble collection device and provides an expansion volume to assure that the chamber 44 is maintained full at all times. A closure 87 closes the filler pipe 86. Annular seals 88 of resilient material are secured around each opening 58 and have bellows extensions 90 leading to each tube 14, 16 and 18, the seals 88 being affixed to each tube by means of a band clamp 92. The seals 88 effectively seal the chamber 44 at the tubes 14, 16 and 18, while the bellows extensions 90 enable limited longitudinal, lateral and swinging movement of the tubes relative to the housing 40 for selective adjustment of the locations of the face plates 34, and the images thereon, relative to one another and relative to mirrors 60 and 62. Such adjustments, carried out by the selective movement provided by brackets 24 and mounting blocks 28, enable accurate registration of the superimposed images at window 70. Thus, each tube 14, 16 and 18 may be adjusted individually for alignment and focus. In this manner, each color may be adjusted individually for focus.

Liquid 74 is chosen from among liquids having an index of refraction as close as is practical to the index of refraction of the material of face plates 34 of the tubes 14, 16 and 18, substrates 64 of mirrors 60 and 62, and window 70 in front wall 52. Preferably, each of these elements is constructed of glass, and liquid 74 is glycerin or a mixture of glycerin and water. Liquid 74 also should be transparent, non-flammable and heat conductive. By choosing a liquid having such an index or refraction, changes are eliminated in the refractive index through the liquid and the elements contacted by the liquid, thereby reducing second surface reflections and skew ray deviations. Thus, substrates 64 can be made thick enough to withstand the thermal and mechanical stresses to which mirrors 60 and 62 will be subjected, without concern for reflections which might otherwise appear at surfaces 94 of the mirrors. In addition, the relatively high index of refraction of liquid 74 has the effect of moving the focal plane closer to the first lens element 100 of projection lens system 72, allowing the use of a faster lens system than would be permitted if the chamber 44 were filled with air. Improved contrast ratio is attained by minimizing any back scatter since the total thickness of the refractive medium from the phosphor on the face plates 34 to the exit pupil at window 70 is greater than that which would enable the critical angle to be reached, with concomitant internal reflections. Thus, the liquid coupling provided by liquid 74 in chamber 44 attains added optical effectiveness as well as thermal advantages. Furthermore, liquid 74 aids in absorbing and thus controlling deleterious X-rays, thereby reducing radiation hazards.

As seen in FIG. 2, window 70 is constructed of a flat plate of glass. Window 70 may be constructed with a curved surface, as seen at 102 in window 104 in an alternate embodiment illustrated in FIG. 4. In this manner, window 104, in connection with the liquid 74 in the chamber 44, represents a liquid corrective lens, or a field flattener, to simplify the construction of projection lens system 72. As also seen in FIG. 4, the mirror means may be constructed in the form of dichroic mirrors each having a layer 106 sealed between two transparent plates 108 which make up the transparent member of each mirror. In this manner, the material of layer 106 is protected against any deleterious effects which may result from direct contact between the layer 106 and liquid 74.

As described above, the provision of selectively movable brackets 24 and mounting blocks 28, together with flexible seals 88, enables each tube 14, 16 and 18 to be aligned and focused individually, while maintaining the integrity of the liquid coupling within the chamber 44 of housing 40. Such an arrangement allows axial focusing of each color individually. Each tube 14, 16 and 18 has a specific phosphor for generating either a blue, red or green image. Each image is folded and trimmed in spectrum bandwith by the use of the crossed dichroic mirrors 60 and 62 immersed in the center of the liquid filled optical coupling housing 40. Since the intersection 110 of the crossed mirrors is well outside of any focal plane, the intersection 110 has no visible effect upon the projected image. The ability thus to present well-defined single-color images, together with the ability to correct image size and shape electronically, enables color corrections to be made both longitudinally and laterally so that only minimal or no color correction need be made in the projection lens system 72. Thus, lens system 72 may be simple in design and economical in construction, since it does not require materials of different refractive index with different dispersions and negative elements to correct for color in the lens system 72. Hence, it becomes practical to employ a plastic lens system of monochromatic design, thereby effecting significant reductions in the cost of manufacture.

All of the above features provide a color-television image projector with a single exit pupil. The projector is simple in construction and reliable in use since all of the primary color images are generated symmetrically and are registered readily into a full-color image of increased clarity and definition. The symmetry of the arrangement of cathode ray tubes 14, 16 and 18 and mirrors 60 and 62 reduces the necessity for electronic corrections, thereby tending to stabilize registration of the single-color images and enabling the images to be superimposed reliably into a full-color image. The single projection lens system enables the projection and focusing of the full-color image over a wide range of selected throw distances in a simplified manner akin to conventional photographic projectors.

It is to be understood that the above detailed description of embodiments of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A color-television image projector comprising:
   a housing including a wall and an enclosed chamber;
   television projection cathode ray tubes having image-producing face plates placed in the housing wall so as to communicate with the chamber, each cathode ray tube being capable of producing a single-color image for projection;
   a transparent window in the housing wall;
   color-selective mirror means located within the chamber for directing the single-color image from at least one of the cathode ray tubes to the window such that the images of the cathode ray tubes will be in superimposed registration with one another;
   a transparent liquid filling the chamber and contacting the face plates, the mirror means, the window, and the housing wall, the transparent liquid having a relatively high index of refraction for bringing the focal plane of the superimposed images in close proximity with the window; and
   a projection lens system associated with the window for projecting the superimposed images appearing at the window.

2. The invention of claim 1 including cooling means associated with the housing wall for removing heat from the chamber, through the liquid.

3. The invention of claim 2 wherein the cooling means includes a heat sink associated with the housing wall and communicating with the exterior of the chamber, and means for passing a cooling fluid over the heat sink externally of the chamber.

4. The invention of claim 1 wherein:
   the housing is substantially parallelepipedal, having six wall portions;
   the cathode ray tubes are placed such that first and second cathode ray tubes are located respectively in opposite first and second wall portions and a third cathode ray tube is located in a third wall portion adjacent to the first and second wall portions; and
   the window is located in a fourth wall portion opposite to the third wall portion.

5. The invention of claim 4 including a heat sink associated with at least one of the fifth and sixth wall portions for removing heat from the chamber, through the liquid.

6. The invention of claim 5 wherein the heat sink communicates with the exterior of the chamber and the cooling means includes means for passing a cooling fluid over the heat sink externally of the chamber.

7. The invention of claim 1 wherein:
the mirror means includes a reflective layer carried by a transparent member; and
the liquid has an index of refraction approximately the same as the index of refraction of the transparent member.

8. The invention of claim 7 wherein the transparent member includes transparent plates and the reflective layer is sealed between the plates to preclude direct contact between the liquid and the layer.

9. The invention of claim 7 wherein the index of refraction of the liquid is approximately the same as the index of refraction of the face plates of the cathode ray tubes and the window.

10. The invention of claim 7 wherein:
the number of cathode ray tubes is three, one for each color-television primary color, the cathode ray tubes being placed on axes located in a single plane and perpendicular to one another;
the color-selective mirror means includes two crossed dichroic mirrors, each mirror being placed at an acute angle to the axis of a corresponding cathode ray tube for reflecting only the primary color image projected by the cathode ray tube associated with that mirror; and
the window is placed perpendicular to one of the axes.

11. The invention of claim 10 wherein the acute angle is about 45°.

12. The invention of claim 10 wherein the transparent member includes transparent plates and the reflective layer is sealed between the plates to preclude direct contact between the liquid and the layer.

13. The invention of claim 12 wherein the window includes a curved surface to serve as an additional optical element in conjunction with the projection lens system.

14. The invention of claim 12 including means for selectively adjusting the position of at least one of the cathode ray tubes relative to the others to assure accurate registration of the superimposed primary color images.

15. The invention of claim 12 including cooling means associated with the housing wall for removing heat from the chamber, through the liquid.

16. The invention of claim 15 wherein the cooling means includes a heat sink associated with the housing wall and communicating with the exterior of the chamber, and means for passing a cooling fluid over the heat sink externally of the chamber.

17. The invention of claim 12 wherein:
the housing is substantially parallelepipedal, having six wall portions;
the cathode ray tubes are placed such that first and second cathode ray tubes are in corresponding opposite first and second wall portions and a third cathode ray tube is in a third wall portion adjacent to the first and second wall portions; and
the window is in a fourth wall portion opposite to the third wall portion.

18. The invention of claim 17 including a heat sink associated with at least one of the fifth and sixth wall portions for removing heat from the chamber, through the liquid.

19. The invention of claim 18 wherein the heat sink communicates with the exterior of the chamber and the cooling means includes means for passing a cooling fluid over the heat sink externally of the chamber.

20. In an image projector in which images from a plurality of image-producing devices are superimposed into a single projected image, the improvement comprising:
a housing including a wall and an enclosed chamber;
the image-producing devices being associated with the housing wall so as to communicate with the chamber;
a transparent window in the housing wall;
color-selective mirror means located within the chamber for directing the image from at least one of the image-producing devices to the window such that the images of the image-producing devices will be in superimposed registration with one another;
a transparent liquid filling the chamber and contacting the image-producing devices, the mirror means, the window, and the housing wall, the transparent liquid having a relatively high index of refraction for bringing the focal plane of the superimposed images in close proximity with the window; and
a projection lens system associated with the window for projecting the superimposed images appearing at the window.

21. The invention of claim 20 including cooling means associated with the housing wall for removing heat from the chamber, through the liquid.

22. The invention of claim 21 wherein the cooling means includes a heat sink associated with the housing wall and communicating with the exterior of the chamber, and means for passing a cooling fluid over the heat sink externally of the chamber.

23. The invention of claim 20 wherein:
the housing is substantially parallelepipedal, having six wall portions;
the image-producing devices are placed such that first and second image-producing devices are in corresponding opposite first and second wall portions and a third image-producing device is in a third wall portion adjacent to the first and second wall portions; and
the window is in a fourth wall portion opposite to the third wall portion.

24. The invention of claim 23 including a heat sink associated with at least one of the fifth and sixth wall portions for removing heat from the chamber, through the liquid.

25. The invention of claim 24 wherein the heat sink communicates with the exterior of the chamber and the cooling means includes means for passing a cooling fluid over the heat sink externally of the chamber.

26. The invention of claim 20 wherein:
the mirror means includes a reflective layer carried by a transparent member; and
the liquid has an index of refraction approximately the same as the index of refraction of the transparent member.

27. The invention of claim 26 wherein the transparent member includes transparent plates and the reflective layer is sealed between the plates to preclude direct contact between the liquid and the layer.

28. The invention of claim 27 including cooling means associated with the housing wall for removing heat from the chamber, through the liquid.

29. The invention of claim 28 wherein the cooling means includes a heat sink associated with the housing wall and communicating with the exterior of the chamber, and means for passing a cooling fluid over the heat sink externally of the chamber.

30. The invention of claim 26 wherein:
the housing is substantially parallelepipedal, having six wall portions;
the image-producing devices are placed such that first and second image-producing devices are in corresponding opposite first and second wall portions and a third image-producing device in a third wall portion adjacent to the first and second wall portions; and
the window is in a fourth wall portion opposite to the third wall portion.

31. The invention of claim 30 including a heat sink associated with at least one of the fifth and sixth wall portions for removing heat from the chamber, through the liquid.

32. The invention of claim 31 wherein the heat sink communicates with the exterior of the chamber and the cooling means includes means for passing a cooling fluid over the heat sink externally of the chamber.

* * * * *